United States Patent [19]

Kolacny

[11] Patent Number: 5,636,702

[45] Date of Patent: Jun. 10, 1997

[54] AERODYNAMIC AND GROUND EFFECT CRAFT

[76] Inventor: Gordon S. Kolacny, 514 W. 29th St., Loveland, Colo. 80538

[21] Appl. No.: 257,526

[22] Filed: Jun. 9, 1994

[51] Int. Cl.$^6$ ........................................... B60V 1/04
[52] U.S. Cl. .................... 180/122; 180/117; 180/120; 180/129; 244/12.1
[58] Field of Search ........................ 180/116, 117, 180/118, 120, 121, 126, 127, 128, 129, 122; 244/12.1, 12.3, 23 B

[56] References Cited

U.S. PATENT DOCUMENTS

| | | | |
|---|---|---|---|
| 3,082,976 | 3/1963 | Dornier | 180/120 |
| 3,190,582 | 6/1965 | Lippisch | 180/117 |
| 3,908,783 | 9/1975 | Joerg et al. | 180/120 X |
| 3,931,942 | 1/1976 | Alpent | 180/117 X |
| 4,712,630 | 12/1987 | Blum | 180/117 |
| 5,065,833 | 11/1991 | Matsuoka et al. | 180/117 |
| 5,071,088 | 12/1991 | Betts | 244/12.1 |
| 5,105,898 | 4/1992 | Bixel, Jr. | 180/117 |
| 5,267,626 | 12/1993 | Tanfield, Jr. | 180/117 |
| 5,314,035 | 5/1994 | Schoell | 180/117 X |
| 5,335,742 | 8/1994 | Blum | 180/117 |

FOREIGN PATENT DOCUMENTS 0023340  2/1981  European Pat. Off. ............... 180/117

*Primary Examiner*—Anne Marie Boehler
*Assistant Examiner*—F. Zeender
*Attorney, Agent, or Firm*—Joseph C. Herring

[57] ABSTRACT

A craft for ground effect and aerodynamic flight has, in addition to the usual vertical and horizontal stabilizer(s), a primary, upper airfoil, a lower secondary airfoil and a pivotable flap. The upper surface of the primary airfoil forms the primary lifting surface for aerodynamic flight while the lower surface forms, at its anterior and, an air intake for the compressors powering the craft and, to the rear, the upper surface of a plenum for ground effect flight. The upper surface of the secondary airfoil forms the lower surface of the compressor air intake at its anterior end and a compressed air exhaust at its other end. The lower surface forms the anterior end of the plenum when the pivotable flap is in the down position. The pivotable flap is attached near the forward end of the lower surface of the secondary airfoil to block the flow of compressed gases out the front of the craft during landing and while in hovercraft mode. Preferred models have a vertical stabilizer forward of the cockpit.

9 Claims, 5 Drawing Sheets

AERODYNAMIC AND GROUND EFFECT CRAFT

BACKGROUND OF THE INVENTION

A variety of craft are taught which use an aerodynamic hull with one or more of forward and/or rear flaps for longitudinal air containment and lateral walls or pontoons for air containment during flight. Examples are U.S. Pat. No. 5,267,626 to T. W. Tanfield, Jr. and U.S. Pat. No. 3,931,942 to M. A. Alpert.

U.S. Pat. No. 5,267,626 issued to T. W. Tanfield, Jr. teaches an aerodynamically shaped, near surface vehicle which combines ground effects and aerodynamic flight functions. The vehicle uses a diverted thrust air cushion to attain lift, then uses airfoils to achieve lift at higher speeds. The initial lift is provided by diverting thrust air flow from the propulsion gas exit to the forward area of an enclosed hull lift area. Cruising lift is provided by fixed wing airfoils and by pivoting the hull end flaps to reduce drag while maintaining a ground effect flight.

U.S. Pat. No. 3,931,942 issued to M. A. Alpert teaches an aerodynamically shaped multi-function aircraft utilizing a series of short cord airfoils positioned below the fuselage and a combination of pivoting forward and rear air walls to provide the needed air cushion for ground effect activities.

There has been a need for a flying craft which, depending on the time and place, could be a ground effect(s) or an aircraft. Preferably, such a craft would require a very short take-off and landing area. While many near surface and aircraft have been designed, none has been commercialized which meets these needs in a low cost craft.

The craft of this invention accomplishes short take-offs and landings, aerodynamic flight and near surface effect operations. Further, the design concept is sufficiently flexible so that it can be built as a small flying flivver or a large transport and can be powered by reciprocating and/or jet turbine engines.

SUMMARY OF THE INVENTION

An aerodynamically configured craft with the usual flaps and stabilizers, a primary upper airfoil, a secondary lower airfoil and a forwardly positioned, pivotable flap can fly in a hovercraft, ground effect and aircraft modes by moving the forward flap between the vertical and horizontal positions. Pontoons and/or side walls provide lateral air containment.

DETAILED DESCRIPTION OF THE FIGURES

Figure 1:
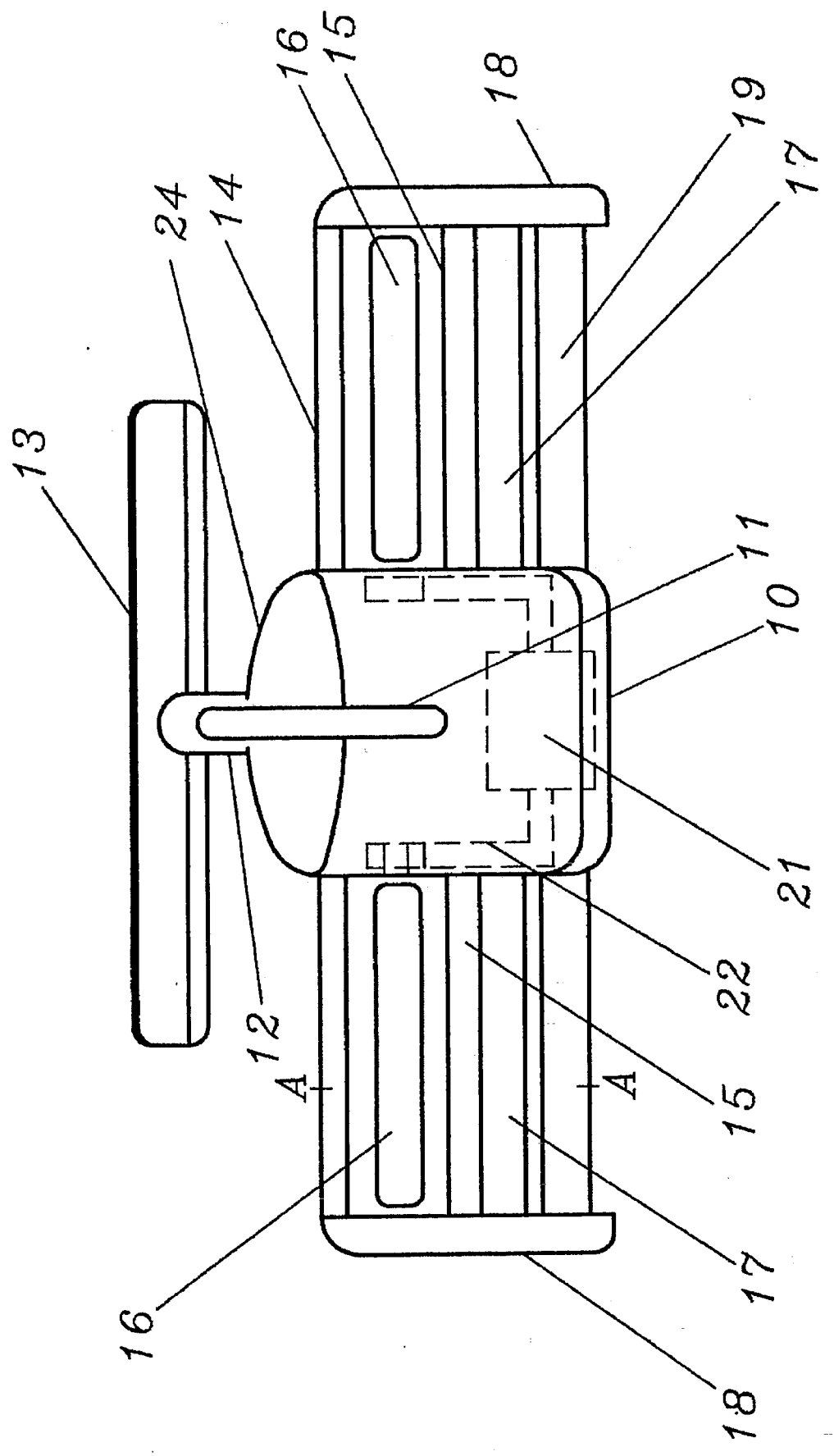
FIG. 1 is a front view of a preferred small craft with both forward and rear vertical stabilizers.
Figure 2:
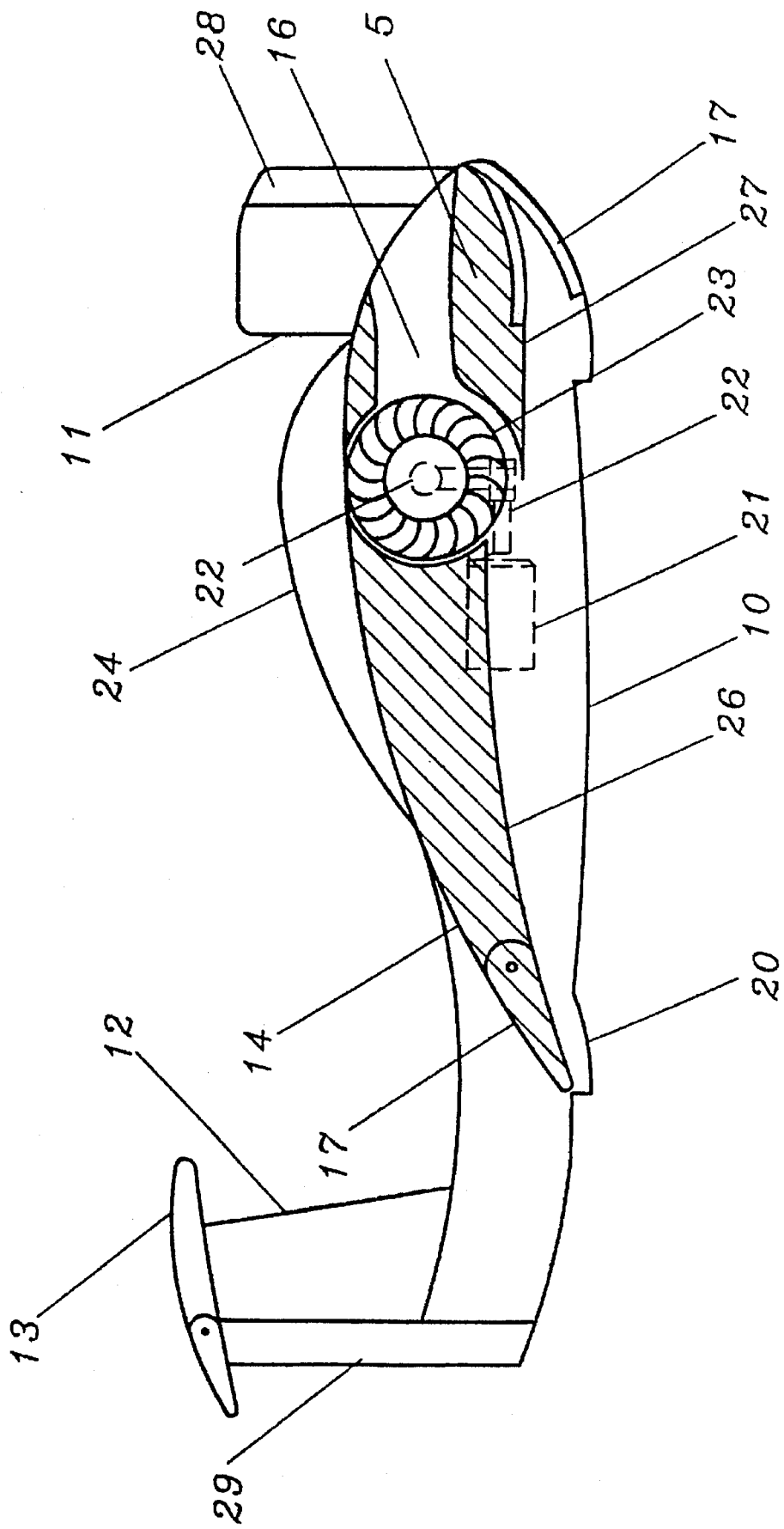
FIG. 2 is a side view of the craft of FIG. 1 sectioned along the line A—A of FIG. 1.

The craft of FIGS. 1–2 has a fuselage 10 with forward and rear vertical stabilizers 11 and 12, respectively. Stabilizer 12 has, positioned on its upper edge, a horizontal stabilizer 13. Primary and secondary air foils 14 and 15 bracket an air intake 16. An exhaust air flow control flap 17 is pivotally attached to the underside of airfoil 15 near its leading edge. Flap 17 is in the retracted or "up" position for aerodynamic flight. When flap 17 is in the substantially perpendicular or "down" position, air from cross flow fans 23 is contained within the air containment plenum provided by flap 17, undersurfaces 26 and 27 of primary and secondary airfoil 14 and 15 and pontoons 18 (FIG. 2). A flight control flap 19 is the primary control for primary airfoil 14. The craft is powered by engine 21, drive train 22 and cross flow fan 23. Canopy 24 encloses the cockpit.

FIG. 2 additionally depicts the "steps" 20 on the bottom of fuselage 10. The steps are required for easier take-offs from water. It also shows the rudders 28 and 29 of vertical stabilizers 11 and 12 respectively.

Figure 3:
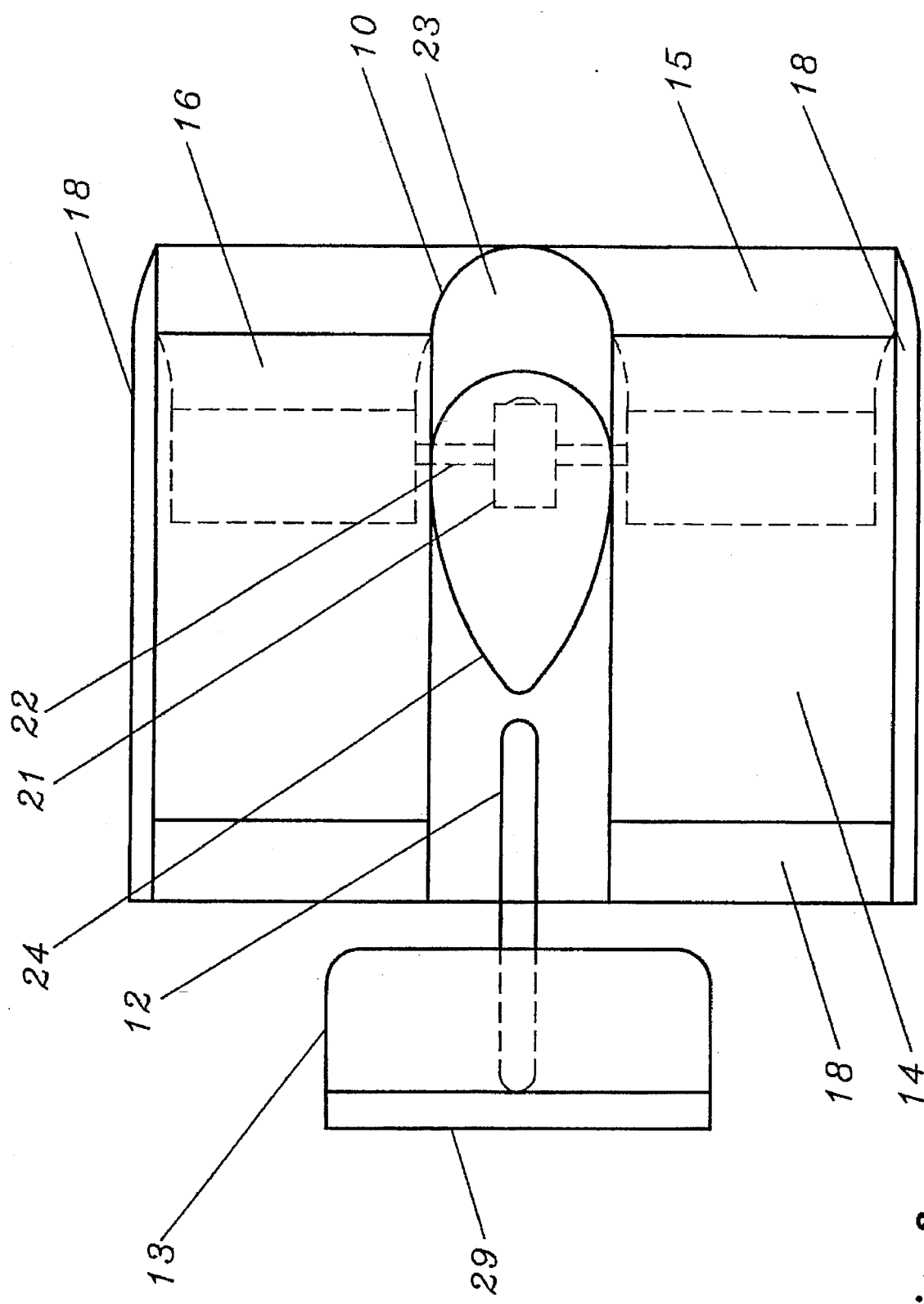
FIG. 3 is a top view of a craft similar to that of FIG. 1.

FIG. 3 depicts an embodiment similar to that of FIGS. 1 and 2 except that the engine 21 is positioned more forward.

Figure 4:
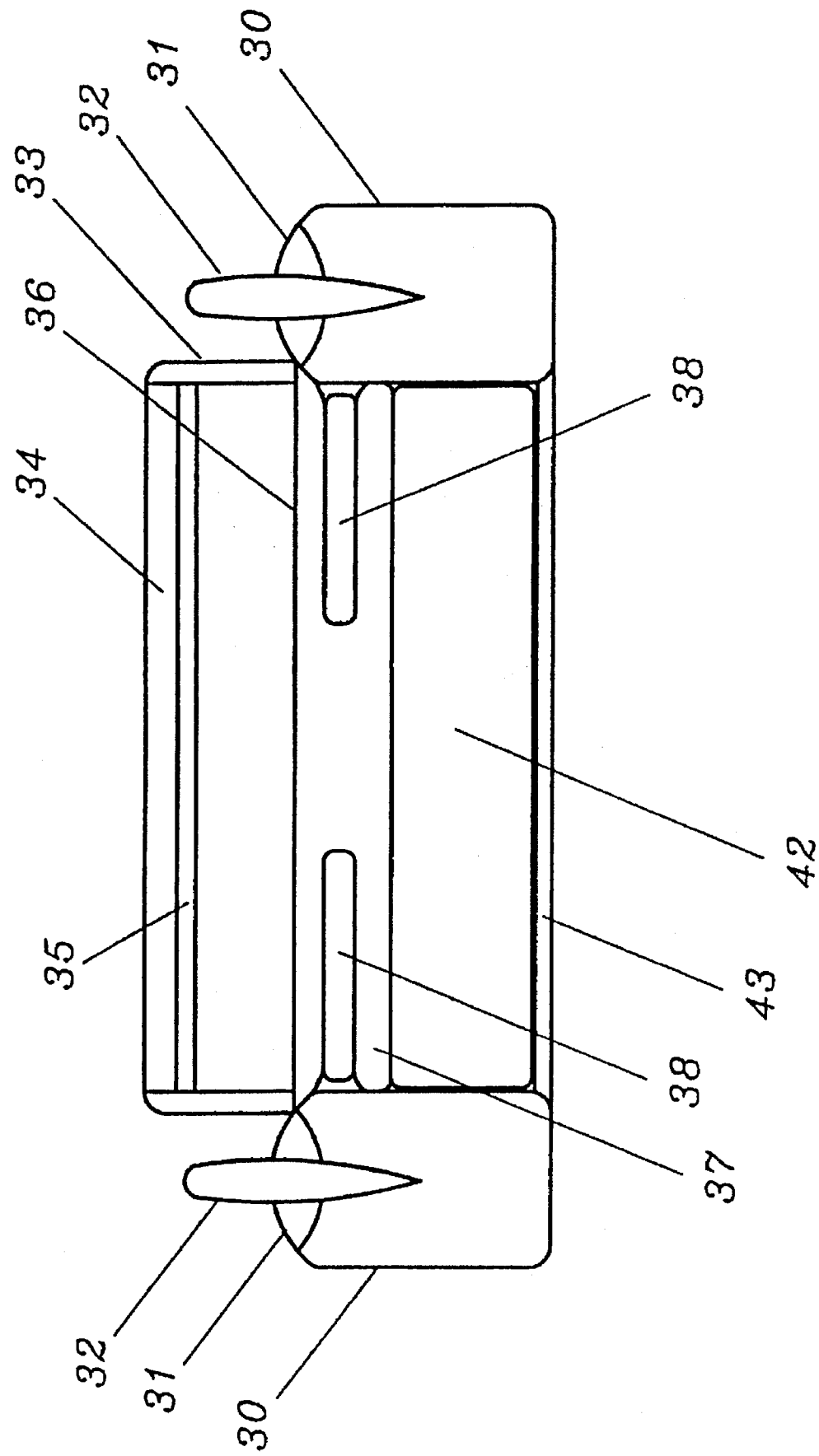
FIG. 4 depicts a front view of an embodiment having double hulls.
Figure 5:
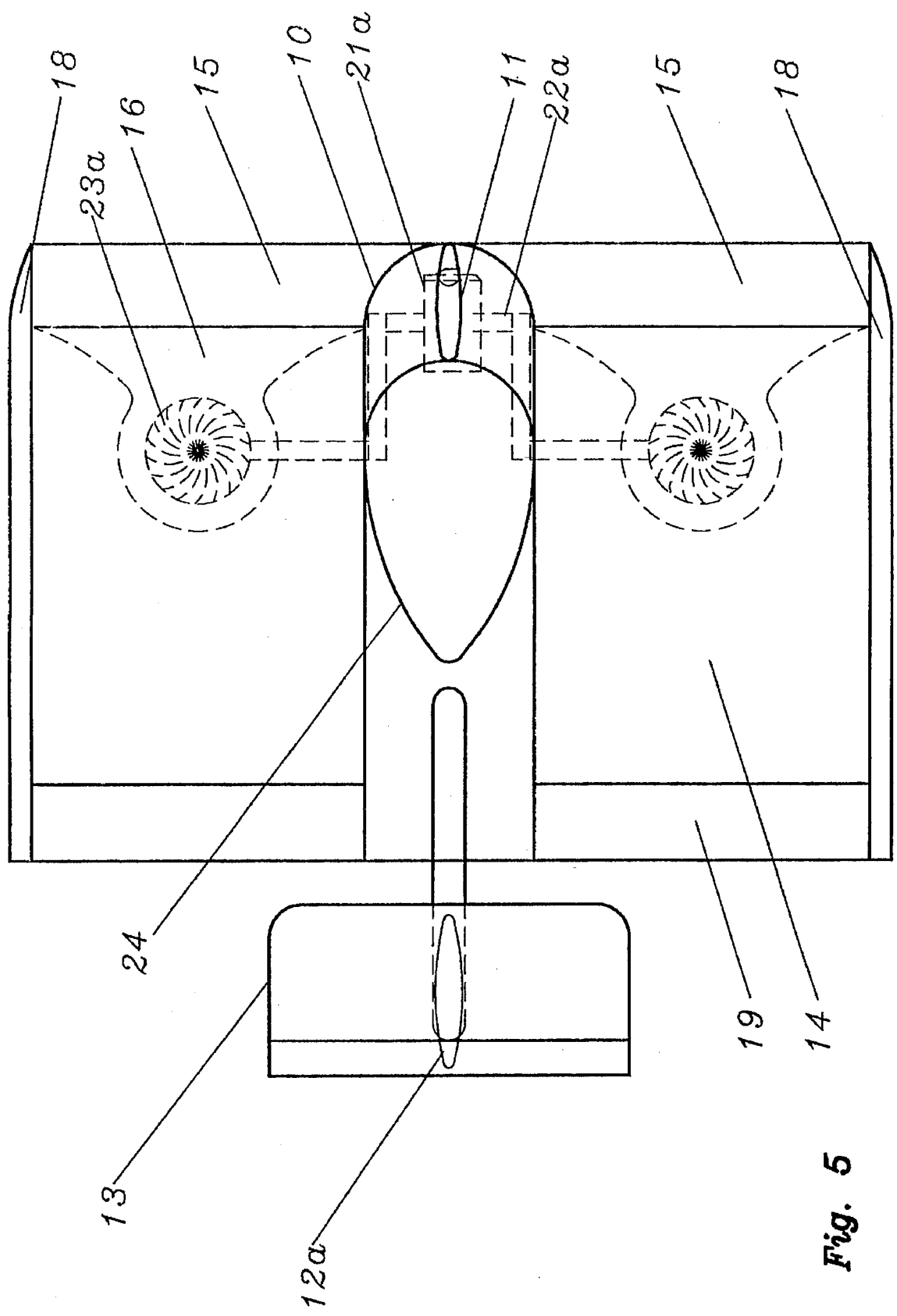
FIG. 5 depicts a top view of an embodiment with a forward mounted engine powering horizontally mounted, downwardly thrusting turbines.

FIGS. 4 and 5 teach a craft utilizing the numbers of FIG. 3 except that changed elements use an additional alphabetical designation.

In the embodiment of FIG. 4, there are twin fuselages 30 with canopies 31, forward vertical stabilizers 32 and rear vertical stabilizers 33. A horizontal stabilizer 34 with flap 35 is attached to the upper surfaces of stabilizers 33. The primary airfoil 36 and secondary airfoil 37 form the upper and lower surfaces of air intakes 38. Gas turbines (not shown) power the craft. The forward flap 42 is shown in the down position where it partially obscures the view of flap 43 attached to the rear edge of primary airfoil 36.

In the embodiment of FIG. 5, the engine 21a is placed forward of the cockpit and the drive train 22a conforms to the new engine configuration. Additionally, a down thrusting gas turbine 23a has been substituted for the fan of FIG. 1.

GENERAL DESCRIPTION OF THE INVENTION

Outdoor enthusiasts, hunters, fisherfolk and others have needed a craft which is lightweight and, depending on power and configuration, can be used for amateur or heavy transport purposes. The present craft provides the design flexibility to provide each group a craft which provides for their needs.

FIGS. 1 and 2 teach a lightweight craft for the amateur outdoors enthusiast which can take off with minimal forward motion and land by "flaring" much as a helicopter does. It also provides slow ground effect flight where higher speed aerodynamic flight is not needed. FIG. 4 provides one design of several which can be used for heavy transport.

The materials used in construction of these craft will be the standard metals, alloys and composites used by the aircraft industry. The reciprocating and gas turbine engines will, preferably, be those of the aircraft industry. The gas turbine engines will preferably have the "pancake" shape of some turbines developed for the U.S. military.

The preferred cross flow fans for light "flying flivvers" produce no yaw-producing torque problems if operated at the same RPM. Other air compressor and gas turbines can also be operated to produce no or acceptable lateral torque.

The controls will be those normal to the aircraft industry for the particular type of craft being designed. The pivotable flap will preferably be integrated into a helicopter-type control column but can even be controlled independently of the other flaps, spoilers, etc. normal and appropriate to aircraft designed for different uses. The operation of the craft can be accomplished manually or with computer assistance. While a craft is shown having only a rear vertical stabilizer, this craft is more difficult to control.

I claim:

1. A craft for hovercraft mode operation and aerodynamic flight including a control mechanism comprising, when the craft is in substantially the horizontal plane:

at least one fuselage;

vertical and horizontal stabilizer means; connected to each of the at least one fuselage for controlling the flight of the craft;

at least one compressor means for providing propulsion and lift to the craft;

at least one each of primary airfoil means, secondary airfoil means, air intake and anterior flap means;

the at least one primary airfoil means, having an upper surface which is substantially unbroken from rear to front and which, at the front, forms at least an upper portion of at least one forward facing air intake; the at least one forward facing air intake being positioned adjacent the front edge of the primary airfoil, and the at least one secondary airfoil means being positioned at least partially beneath the at least one primary airfoil means and having front and rear portions, the front portion of which forms at least a part of a lower portion of the at least one air intake and the rear lower portion of which forms at least a part of at least one exhaust outlet;

at least one anterior flap means for use in the hovercraft mode operation affixed, at one end, to the lower anterior portion of the at least one secondary airfoil means for air containment when the at least one anterior flap means is in an aerodynamic airflow blocking position in the hovercraft mode operation; and lateral means for air containment for operation with the at least one anterior flap means when the craft is in the hovercraft mode operation.

2. The craft of claim 1 having multiple fuselages.

3. The craft of claim 1 wherein the compressor means is a cross flow fan.

4. The craft of claim 1 wherein the compressor means is an air compressor.

5. The craft of claim 1 wherein the compressor means is a gas turbine.

6. The craft of claim 1 wherein the lateral means for air containment are pontoons.

7. The craft of claim 2 wherein the lateral means for air containment comprises the multiple fuselages.

8. The craft of claim 1 wherein each of the at least one fuselage is stepped.

9. The craft of claim 1 wherein the control mechanism for the craft and the flap means are integrated for operating the craft.

* * * * *